United States Patent [19]

Jeong

[11] Patent Number: 5,350,971

[45] Date of Patent: Sep. 27, 1994

[54] BLUE-EMITTING PHOSPHOR FOR USE IN FLUORESCENT LAMPS AND FLUORESCENT LAMP EMPLOYING THE SAME

[75] Inventor: Il-hyeok Jeong, Seoul, Rep. of Korea

[73] Assignee: Samsung Electron Devices Co., Ltd., Kyungki-do, Rep. of Korea

[21] Appl. No.: 74,543

[22] Filed: Jun. 11, 1993

[30] Foreign Application Priority Data

Feb. 18, 1993 [KR] Rep. of Korea .................. 1993 2255

[51] Int. Cl.$^5$ ........................... C09K 11/80; H01J 1/63
[52] U.S. Cl. ............................... 313/487; 252/301.4 R
[58] Field of Search .................. 252/301.4 R; 313/487

[56] References Cited

U.S. PATENT DOCUMENTS 4,837,481  6/1989  Verstegen et al. ........... 252/301.4 R

FOREIGN PATENT DOCUMENTS 59-102979  6/1984  Japan ............................ 252/301.4 R Primary Examiner—Jack Cooper
Attorney, Agent, or Firm—Leydig, Voit & Mayer

[57] ABSTRACT

A blue-emitting phosphor of europium-activated barium magnesium aluminate is used in a high color rendering three-band type fluorescent lamp, in which the particle size distribution is uniform to obtain excellent phosphor layer. A fluorescent lamp employing the blue-emitting phosphor mixed with red and green-emitting phosphors has a uniform emission luminance distribution and increased luminous flux intensity. The employed blue phosphor is expressed:

$$Ba_aMg_bAl_cLa_xO_{a+b+3(c+x)/2}:Eu_d$$

where $0.1 \leq a \leq 2.4$, $0.1 \leq b \leq 5$, $8 \leq c \leq 64$, $0.001 \leq x \leq 0.2$, and $0.1 \leq d \leq 4$.

13 Claims, 4 Drawing Sheets

BLUE-EMITTING PHOSPHOR FOR USE IN FLUORESCENT LAMPS AND FLUORESCENT LAMP EMPLOYING THE SAME

BACKGROUND OF THE INVENTION

The present invention relates to a blue-emitting phosphor for use in a fluorescent lamp and a fluorescent lamp employing the same, and particularly to an aluminate phosphor, as a blue-emitting phosphor which is mixed with a red-emitting phosphor and a green-emitting phosphor to be used in a three-band type fluorescent lamp with a high color-rendering properties, which has a uniform particle size distribution and improved suitability to a phosphor layer, and to a fluorescent lamp which employs the aluminate phosphor to increase in luminous flux intensity.

Generally, a fluorescent lamp for illumination uses a phosphor which absorbs the 254 nm Hg-resonance wave and is activated so as to convert the ultraviolet luminescence of mercury vapor into visible light. In a conventional fluorescent lamp for illumination, a white-emitting calcium halophosphate phosphor, such as $Ca_{10}(PO_4)_6(F,Cl)_2:Sb,Mn$, has usually been used. Recently, in order to improve the color-rendering properties and emission output of fluorescent lamps, a three-band type fluorescent lamp which employs the proper mixture of red, green and blue-emitting phosphors whose emission spectrum occupies a relatively narrow band, has been put to practical use. For instance, for the blue-emitting phosphor, europium-activated barium magnesium aluminate phosphor ($BaMg_2Al_{16}O_{27}:Eu^{2+}$), for the green-emitting phosphor, cerium and terbium-activated magnesium aluminate phosphor [(Ce, Tb)$MgAl_{11}O_{19}$], and for the red-emitting phosphor, europium-activated yttrium oxide phosphor ($Y_2O_3$:$Eu^{3+}$) are mixed in adequate ratio.

In such a three-band type phosphor lamp, since the emitting colors of the respective phosphors are considerably different from one another, if the emitting intensity of a corresponding phosphor is decreased when used in the fluorescent lamp, color deviation occurs, degrading the color-rendering properties.

As the blue-emitting phosphor used in such a three-band fluorescent lamp, $BaMgAl_{16}O_{27}:Eu^{2+}$ is disclosed in Japanese patent publication sho 52-22836, in which the emitting intensity is undesirably reduced with the elapse of time. Due to this, when the blue-emitting phosphor is used in the three-band type fluorescent lamp, since divalent europium-activated barium magnesium aluminate phosphors suffer more sever deterioration than the green-emitting phosphor (for instance, cerium and terbium-activated magnesium aluminate phosphor) and the red-emitting phosphor (for instance, europium-activated yttrium oxide phosphor) which are used together with the blue-emitting phosphor, in the three-band type fluorescent lamp using the divalent europium-activated barium magnesium aluminate phosphor as the blue-emitting phosphor, the emitting color varies greatly during the use of the lamp. Therefore, a blue-emitting phosphor for use in a fluorescent lamp, having a high emission intensity and at the same time a low reduction rate of the emission intensity during the use of the lamp, is required.

U.S. Pat. No. 4,249,108 discloses blue-emitting Eu-activated phosphor compositions within a $La_2O_3$—$MgO$—$Al_2O_3$ system. U.S. Pat. No. 4,733,126 discloses a blue-emitting aluminate phosphor expressed as a general formula of $(Ba_wCa_xMg_yEu_z)O.aAl_2O_3.bSiO_2$ where $0.1 \leq w \leq 0.5$, $0.0004 \leq x \leq 0.0020$, $0.1 \leq y \leq 0.8$, $0.03 \leq z \leq 0.10$, $w+x+z=1$, $1.5 \leq a \leq 4.5$, and $0.0005 < b \leq 0.0030$.

Further, Japanese laid-open patent publication No. sho 61-254689 discloses a phosphor expressed as a general formula of $(Ba,Eu)O.xMgO.yGd_2O_3.zAl_2O_3$ where $0.8 \leq x \leq 3.0$, $0 < y \leq 0.05$, and $4 \leq z \leq 8$. Here, a small amount of gadolinium oxide is added to the barium magnesium aluminate phosphor activated by divalent Eu to stabilize the phosphor crystal so that the decrease of the emission intensity of the phosphor is prevented and the deterioration of the fluorescent lamp is minimized while in use.

However, such aluminate phosphors are disadvantageous in that they have poor suitably to a phosphor layer because the particles of the phosphors themselves are difficult to control.

SUMMARY OF THE INVENTION

Therefore, considering the above problems of such aluminate phosphors, it is an object of the present invention to provide a blue-emitting phosphor having improved suitability to a phosphor layer by controlling the particle size distribution so as to be uniform.

It is another object of the present invention to provide a fluorescent lamp which has a uniform luminance distribution and increased luminous flux intensity by employing the blue-emitting phosphor of the present invention which has a uniform particle size distribution.

To accomplish the first object of the present invention, there is provided a blue-emitting phosphor of europium-activated barium magnesium aluminate expressed by the following general formula:

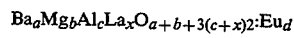

$$Ba_aMg_bAl_cLa_xO_{a+b+3(c+x)2}:Eu_d$$

where $0.1 \leq a \leq 2.4$, $0.1 \leq b \leq 5$, $8 \leq c \leq 64$, $0.001 \leq x \leq 0.2$, and $0.1 \leq d \leq 4$.

To accomplish the second object of the present invention, there is provided a fluorescent lamp containing the above europium-activated barium magnesium aluminate phosphor as the blue-emitting phosphor.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
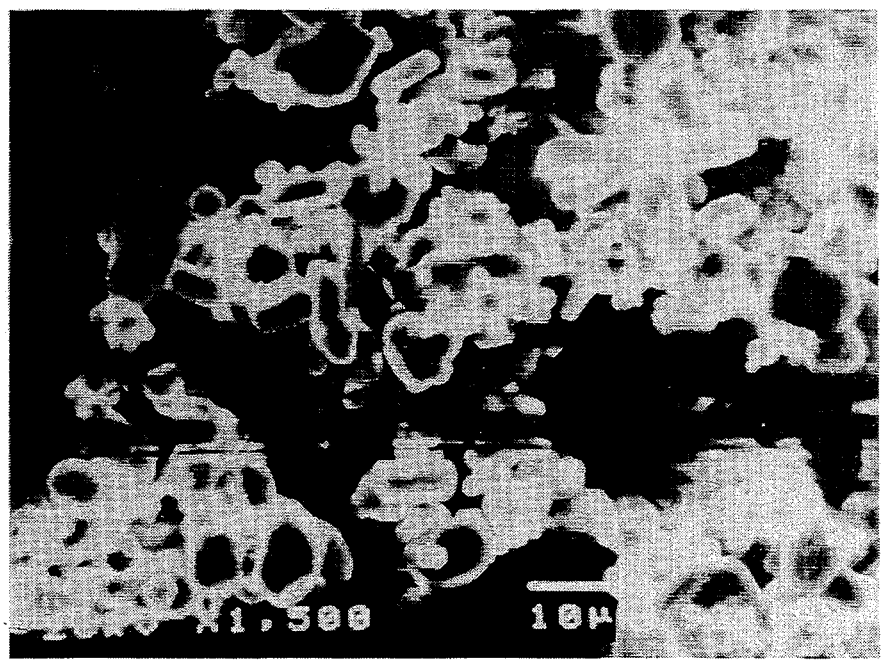
FIG. 1 is a 1,500-times-magnified photograph of phosphor particles manufactured in a comparative example.

The blue-emitting phosphor of the present invention is characterized in that, by adding La of a predetermined ratio into a phosphor having the basic structural formula of $BaMg_2Al_{16}O_{27}$:Eu, the reaction rate of Ba, Mg and Al is controlled during the baking procedure of phosphor, so that the resulting phosphor has a uniform particle size distribution and the particle size of the phosphor is controlled according to the amount of La.

In the phosphor of the present invention, the host materials Ba, Mg and Al are added at ratios of 0.1–2.4 mole, 0.1–5 moles and 8–64 moles, respectively. Activator Eu is added at the ratio of 0.1–4 moles. La which controls the reaction rates between them is added at the ratio of 0.001–0.2 moles. When the amount of La is less than 0.001 moles, the control of reaction rates and the effect of suppressing particle growth due to La cannot be expected. When La is more than 0.2 moles, the added La varies the intervals of energy levels of the host structure to greatly reduce the emission intensity. Therefore, La should be used within the range of 0.001–0.2 moles.

In selecting phosphor materials of the blue-emitting phosphor of the present invention, any Ba compound, such as $BaCO_3$ or BaO, may be used as the source of Ba, and any Mg compound, such as $MgCO_3$ or MgO, may be used as the source of Mg. As the source of Al, $Al_2O_3$ may be used, and as the source of activator Eu, $Eu_2O_3$ may be used. As the source of La, $La_2O_3$ or $La(NO_3)_3$ may be used, and any of La compounds excluding lanthanum chloride may also be used. As a flux, $AlF_3$, $BaF_2$, $MgF_2$ or LiF may be used.

Predetermined amounts of the above materials are weighed and mixed sufficiently. The mixture is put in a refractory container and first sintered in an oxidation atmosphere for 1–4 hours at 1,200°–1,400° C. The first-sintered product is pulverized and sieved by about 300 meshes, and then, second sintered in moderate reducing atmosphere for 1–4 hours at 1,200°–1,400° C. The second-sintered product is washed, filtered, dried and sieved to give the blue-emitting phosphor of the present invention having the structural formula of $Ba_aMg_bAl_cLa_xO_{a+b+3(c+x)/2}$:$Eu_d$, where $0.1 \leq a \leq 2.4$, $0.1 \leq b \leq 5$, $8 \leq c \leq 64$, $0.001 \leq x \leq 0.2$, and $0.1 \leq d \leq 4$.

The present invention will be described in more detail in the following examples. However, the following examples are just to describe and illustrate the present invention and not to confine the present invention.

EXAMPLE 1

| | |
|---|---|
| $BaCO_3$ | 0.1 moles |
| $MgCO_3$ | 0.2 moles |
| $Al_2O_3$ | 0.8 moles (1.6 moles for Al) |
| $Eu_2O_3$ | 0.05 moles (0.1 moles for Eu) |
| $La_2O_3$ | 0.005 moles (0.01 moles for La) |
| $AlF_3$ | 0.03 moles |

The above materials were taken and mixed sufficiently, and first sintered in an oxidation atmosphere for two hours at 1,300° C. The first-sintered material was pulverized, sieved by 300 meshes, and then, second sintered in a moderate reducing atmosphere at 1,300° C. for two hours. The second-sintered material was washed, filtered, dried and sieved to give the blue-emitting phosphor of the present invention having the structural formula of $BaMg_2Al_{16}La_{0.1}O_{27.15}$:Eu.

EXAMPLE 2

While following the same procedures as in Example 1, 0.0005 moles of $La_2O_3$ (0.001 moles for La) were added to give the blue-emitting phosphor of the present invention having the structural formula of $BaMg_2Al_{16}La_{0.01}O_{27.015}$:Eu.

EXAMPLE 3

While following the same procedures as in Example 1, $La(NO_3)_3$ instead of $La_2O_3$ was dissolved in water and the resulting solution was mixed with other materials so that 0.0001 moles of La were added, to give the blue-emitting phosphor of the present invention having the structural formula of $BaMg_2Al_{16}La_{0.001}O_{27.0015}$:Eu.

EXAMPLE 4

While following the same procedures as in Example 1, 0.025 moles of $La_2O_3$ (0.05 moles for La) were added to give the blue-emitting phosphor of the present invention having the structural formula of $BaMg_2Al_{16}La_{0.05}O_{27.075}$:Eu.

EXAMPLE 5

While following the same procedures as in Example 1, 0.01 moles of $La_2O_3$ (0.02 moles for La) were added to give the blue-emitting phosphor of the present invention having the structural formula of $BaMg_2Al_{16}La_{0.2}O_{27.3}$:Eu.

EXAMPLE 6

While following the same procedures as in Example 1, 0.005 moles of $La_2(C_2O_3)_3$ (0.01 moles for La) were added to give the blue-emitting phosphor of the present invention having the structural formula of $BaMg_2Al_{16}La_{0.1}O_{27.15}$:Eu.

EXAMPLE 7

While following the same procedures as in Example 1, 0.01 moles of $BaCO_3$ were added to give the blue-emitting phosphor of the present invention having the structural formula of $Ba_{0.1}Mg_2Al_{16}La_{0.1}O_{26.25}$:Eu.

EXAMPLE 8

While following the same procedures as in Example 1, 0.24 moles of $BaCO_3$ were added to give the blue-emitting phosphor of the present invention having the structural formula of $Ba_{2.4}Mg_2Al_{16}La_{0.1}O_{28.55}$:Eu.

EXAMPLE 9

While following the same procedures as in Example 1, 0.01 moles of $MgCO_3$ were added to give the blue-emitting phosphor of the present invention having the structural formula of $BaMg_{0.1}Al_{16}La_{0.1}O_{25.65}$:Eu.

EXAMPLE 10

While following the same procedures as in Example 1, 0.5 moles of $MgCO_3$ were added to give the blue-emitting phosphor of the present invention having the structural formula of $BaMg_5Al_{16}La_{0.1}O_{30.15}$:Eu.

EXAMPLE 11

While following the same procedures as in Example 1, 0.4 moles of $Al_2O_3$ (0.8 moles for Al) and 0.005 moles of $Eu_2O_3$ (0.01 moles for Eu) were added to give the blue-emitting phosphor of the present invention having the structural formula of $BaMg_2Al_8La_{0.1}O_{15.15}{:}Eu_{0.1}$.

EXAMPLE 12

While following the same procedures as in Example 1, 3.2 moles of $Al_2O_3$ (6.4 moles for Al) and 0.2 moles of $Eu_2O_3$ (0.4 mole for Eu) were added to give the blue-emitting phosphor of the present invention having the structural formula of $BaMg_2Al_{64}La_{0.1}O_{99.15}{:}Eu_4$.

COMPARATIVE EXAMPLE

While following the same procedures as in Example 1, but without $La_2O_3$, the blue-emitting phosphor having the structural formula of $BaMg_2Al_{16}O_{27}{:}Eu$ was obtained.

In evaluating the emission characteristics of the blue-emitting phosphor of the present invention, the emission luminance of the $BaMg_2Al_{16}O_{27}{:}Eu$ phosphor manufactured in the comparative example is taken as a reference so as to measure the emission luminance of the phosphors manufactured in Examples 1-12. The measurement results are shown in the following table, along with the mean values of particle diameters.

As shown in the following table, compared with the conventional blue-emitting phosphor having the structural formula of $BaMg_2Al_{16}O_{27}{:}Eu$, in the blue-emitting phosphors of the present invention manufactured in Examples 1-12, it is noted that the emission luminance and main peak wavelength are barely varied and that the mean values of particle diameters are varied much depending upon the added amount of La.

TABLE

| | relative luminance (%) | main peak wavelength (nm) | particle diameter (μm) |
|---|---|---|---|
| Comparative example | 100 | 452 | 9.1 |
| Example 1 | 97 | 452 | 6.5 |
| Example 2 | 99 | 452 | 7.2 |
| Example 3 | 100 | 452 | 8.3 |
| Example 4 | 98 | 452 | 6.2 |
| Example 5 | 94 | 452 | 5.7 |
| Example 6 | 98 | 452 | 6.7 |
| Example 7 | 92 | 452 | 6.1 |
| Example 8 | 96 | 452 | 6.9 |
| Example 9 | 93 | 452 | 5.8 |
| Example 10 | 95 | 451 | 7.2 |
| Example 11 | 90 | 452 | 7.3 |
| Example 12 | 97 | 452 | 6.5 |

Figure 2:
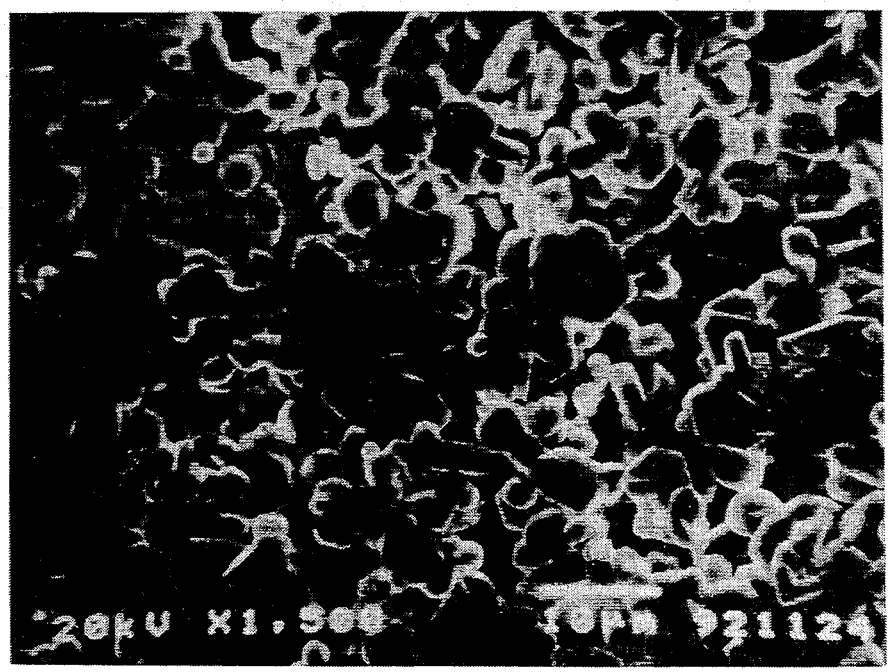
FIG. 2 is a 1,500-times-magnified photograph of phosphor particles manufactured in an example 1.
Figure 3:
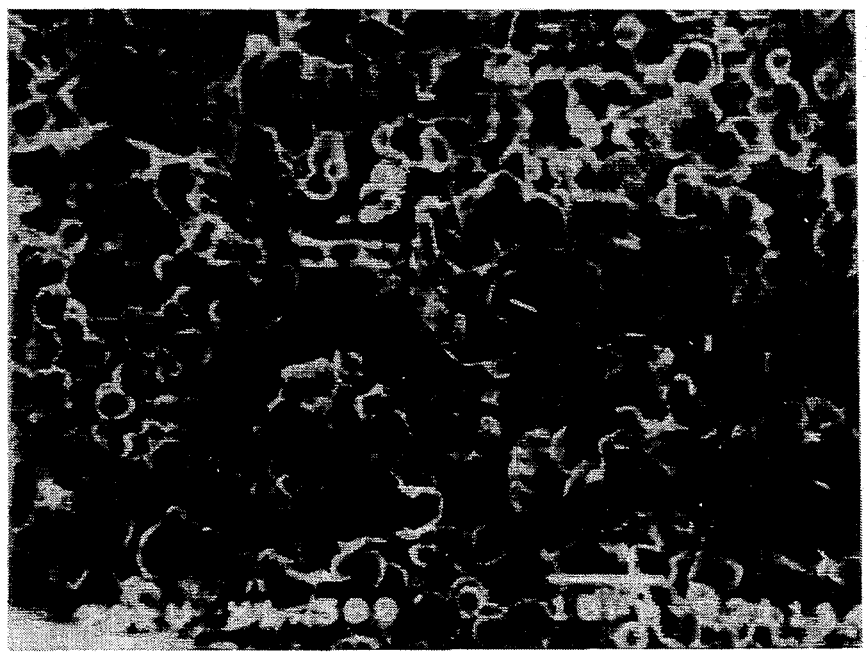
FIG. 3 is a 1,500-times-magnified photograph of phosphor particles manufactured in an example 2.
Figure 4:
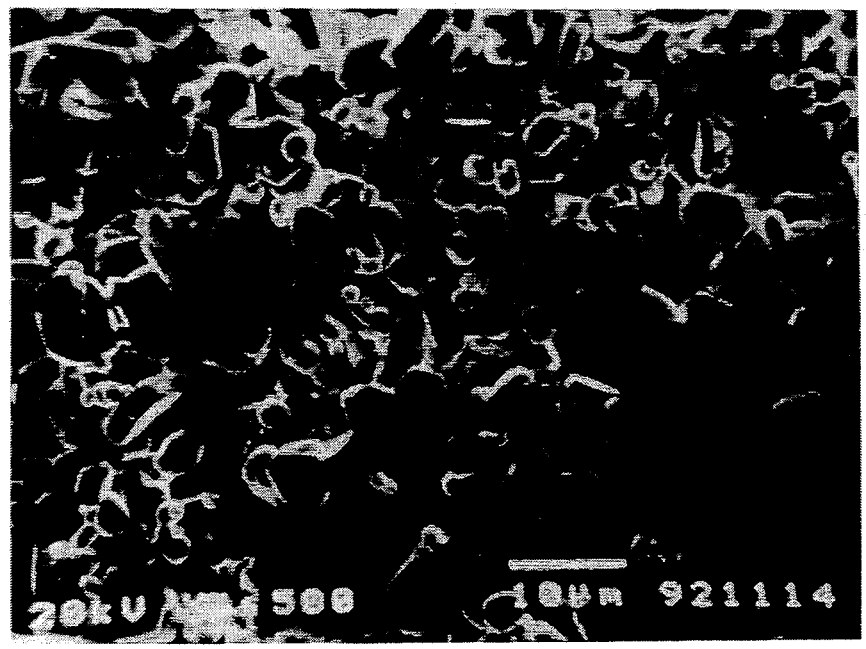
FIG. 4 is a 1,500-times-magnified photograph of phosphor particles manufactured in an example 3.

FIGS. 1-4 show the photographs of blue-emitting phosphors magnified 1,500 times and manufactured in the comparative example (shown in FIG. 1) and Examples 1-3 (shown in FIGS. 2, 3 and 4, respectively). As shown in the photographs, particles of the phosphor manufactured in the comparative example are irregular and stuck together so that, when a phosphor layer is formed, the emission luminance distribution of the layer becomes irregular and the yield decreases. Meanwhile, the particles of the phosphor of the present invention manufactured in Examples 1, 2 and 3, are uniform, so that the emission luminance distribution of the phosphor layers are uniform and the yields increase.

The fluorescent lamp of the present invention is manufactured according to a conventional method by using the europium-activated barium magnesium aluminate phosphor of the present invention as the blue-emitting phosphor.

A fluorescent lamp of the example was manufactured according to an ordinary method in which the phosphors were coated on the inner surface of a glass bulb, while using $BaMg_2Al_{16}La_{0.1}O_{27.15}{:}Eu$ manufactured in the Example 1 as the blue-emitting phosphor and mixing it with $LaPO_4{:}Ce$, Tb as the green-emitting phosphor and with $Y_2O_3{:}Eu$ as the red-emitting phosphor. A fluorescent lamp of the comparative example was manufactured in the same method as the above, by using $BaMg_2Al_{16}O_{27}{:}Eu$ manufactured in the comparative example as the blue-emitting phosphor. These two fluorescent lamps are compared in terms of phosphor layer state and luminous flux intensity.

Figure 5A:
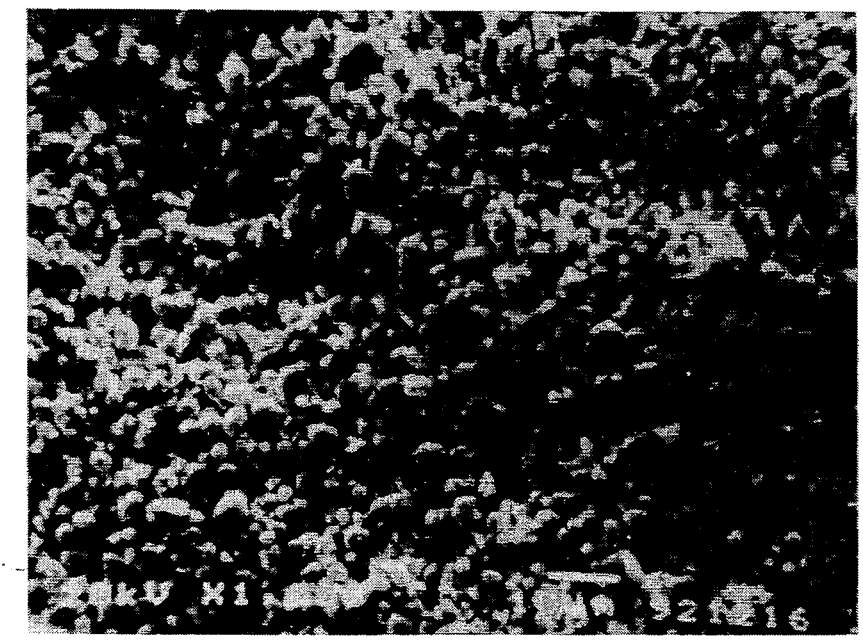
FIGS. 5A and 5B are magnified photographs of the phosphor layer of a fluorescent lamp which is manufactured by employing the phosphor of example 1, FIG. 5A begins magnified 1,000 times and FIG. 5B being magnified 200 times.
Figure 5B:
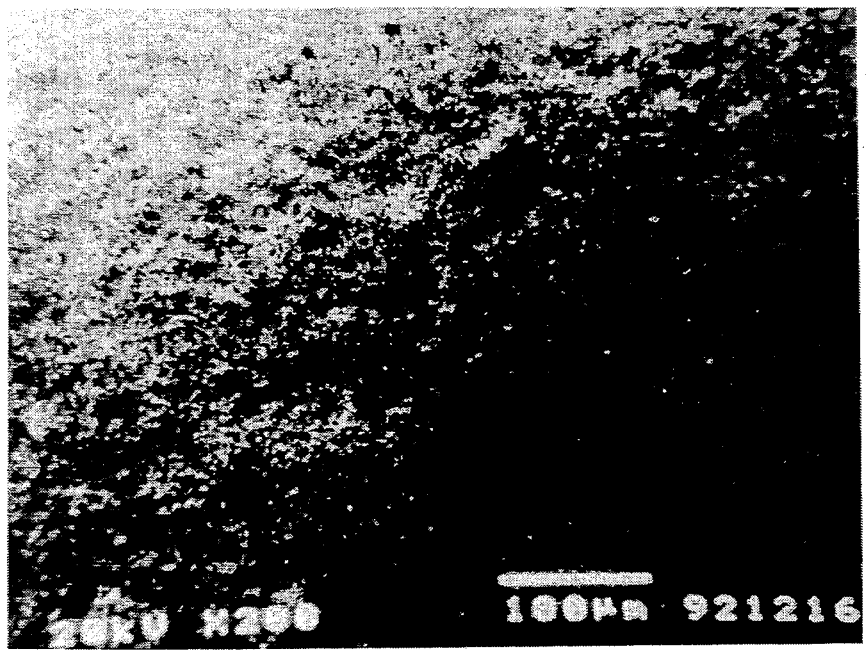
Figure 6A:
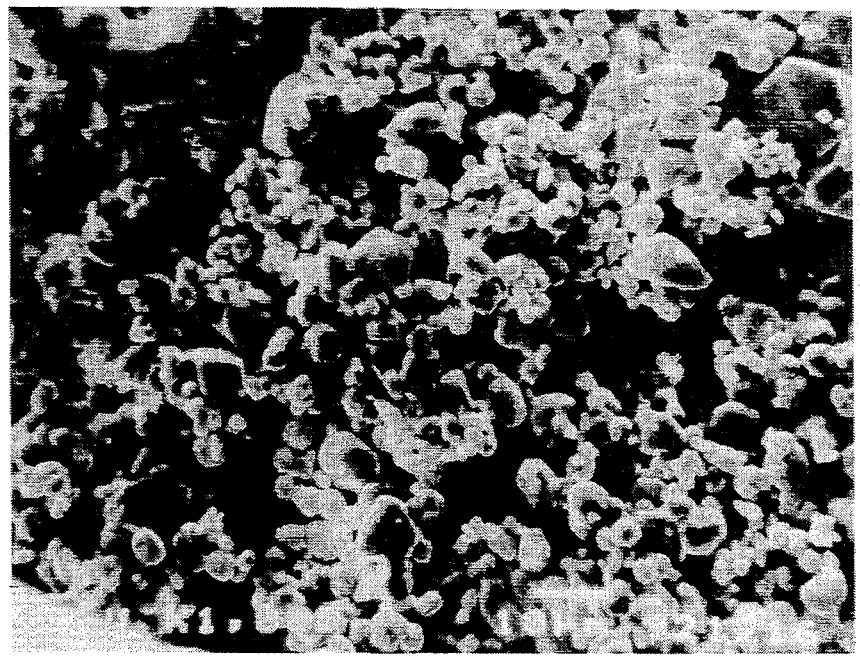
FIGS. 6A and 6B are magnified photographs of the phosphor layer of a fluorescent lamp which is manufactured by employing the phosphor of a comparative example, FIG. 6A being magnified 1,000 times and FIG. 6B being magnified 200 times.
Figure 6B:
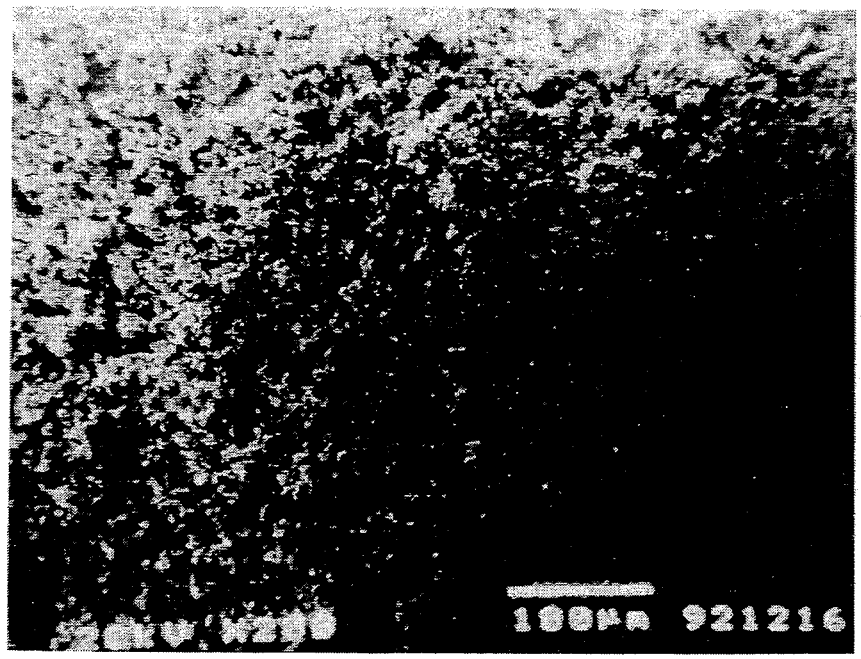

FIGS. 5A, 5B, 6A and 6B show magnified photographs of the phosphor layers of the fluorescent lamps manufactured with the phosphors manufactured in example 1 and the comparative example, FIGS. 5A and 6A being magnified 1,000 times and FIGS. 5B and 6B being magnified 200 times to exhibit the state of phosphor layers. As shown in FIG. 5, in the phosphor layer of fluorescent lamp of the present invention manufactured with the phosphor of the Example 1, the phosphor is uniform in particle size, so that the layer coated therewith is also uniform. On the contrary, in the phosphor layer of the fluorescent lamp of FIG. 6 manufactured with the phosphor of the comparative example, the particle size of the phosphor is ununiform and the particles are stuck together so that the coating state is poor. As mentioned before, such poor coating makes the emission luminance distribution nonuniform, to decrease yield.

When the luminous flux of the fluorescent lamps manufactured in the above examples is measured by a 18 W stabilizer, the fluorescent lamp of the present invention manufactured with the phosphor of Example 1 has the luminous flux of 970 lumens, and the fluorescent lamp manufactured with the phosphor of the comparative example has the luminous flux of 880 lumes. This shows that the phosphor of the present invention has a uniform particle size distribution, to accomplish an excellent phosphor layer and to increase the luminous flux intensity.

As described above, in the blue-emitting phosphor of the present invention having the structural formula of $Ba_aMg_bAl_cLa_xO_{a+b+3(c+x)/2}{:}Eu_d$, the particle size distribution is uniform to obtain an excellent phosphor layer. In the fluorescent lamp employing the phosphor of the present invention as the blue-emitting phosphor, the emission luminance distribution is uniform and the luminous flux intensity is increased.

While the present invention has been particularly shown and described with reference to particular embodiments thereof, it will be understood by those skilled in the art that various changes in form and details may be effected therein without departing from the spirit and scope of the blue-emitting phosphor of the invention and the fluorescent lamp employing the same as defined by the appended claims.

What is claimed is:

1. A blue-emitting phosphor of europium-activated barium magnesium aluminate expressed by the following general formula:

$$Ba_aMg_bAl_cLa_xO_{a+b+3(c+x)/2}{:}Eu_d$$

where $0.1 \leq a \leq 2.4$, $0.1 \leq b \leq 5$, $8 \leq c \leq 64$, $0.001 \leq x \leq 0.2$, and $0.1 \leq d \leq 4$, exhibiting a more uniform particle size distribution than said phosphor absent La.

2. A three-band type fluorescent lamp on the inner surface of which a mixed composition of blue-emitting phosphor, green-emitting phosphor and red-emitting phosphor are coated,
   wherein the blue-emitting phosphor is the europium-activated barium magnesium aluminate phosphor of claim 1; and
   wherein the green-emitting phosphor is $LaPO_4$:Ce,Tb and the red-emitting phosphor is $Y_2O_3$:Eu.

3. A blue-emitting phosphor according to claim 1 having the formula: $BaMg_2Al_{16}La_{0.1}O_{27.15}$:Eu.

4. A blue-emitting phosphor according to claim 1 having the formula: $BaMg_2Al_{16}La_{0.01}O_{27.015}$:Eu.

5. A blue-emitting phosphor according to claim 1 having the formula: $BaMg_2Al_{16}La_{0.001}O_{27.0015}$:Eu.

6. A blue-emitting phosphor according to claim 1 having the formula: $BaMg_2Al_{16}La_{0.05}O_{27.075}$:Eu.

7. A blue-emitting phosphor according to claim 1 having the formula: $BaMg_2Al_{16}La_{0.2}O_{27.3}$:Eu.

8. A blue-emitting phosphor according to claim 1 having the formula: $Ba_{0.1}Mg_2Al_{16}La_{0.1}O_{26.25}$:Eu.

9. A blue-emitting phosphor according to claim 1 having the formula: $Ba_{2.4}Mg_2Al_{16}La_{0.1}O_{28.55}$:Eu.

10. A blue-emitting phosphor according to claim 1 having the formula: $BaMg_{0.1}Al_{16}La_{0.1}O_{25.65}$:Eu.

11. A blue-emitting phosphor according to claim 1 having the formula: $BaMg_5Al_{16}La_{0.1}O_{30.15}$:Eu.

12. A blue-emitting phosphor according to claim 1 having the formula: $BaMg_2Al_8La_{0.1}O_{15.15}$:$Eu_{0.1}$.

13. A blue-emitting phosphor according to claim 1 having the formula: $BaMg_2Al_{64}La_{0.1}O_{99.15}$:$Eu_4$.

* * * * *